United States Patent
Ferry

(10) Patent No.: US 11,480,332 B2
(45) Date of Patent: Oct. 25, 2022

(54) METHOD AND SYSTEM FOR ASSESSING A CONDITION OF A BOILER

(71) Applicant: GENERAL ELECTRIC COMPANY, Schenectady, NY (US)

(72) Inventor: Allan Gunn Ferry, Windsor, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/161,759

(22) Filed: Jan. 29, 2021

(65) Prior Publication Data

US 2022/0243909 A1 Aug. 4, 2022

(51) Int. Cl.
*F22B 37/38* (2006.01)
*G01N 27/04* (2006.01)
*G01N 27/20* (2006.01)

(52) U.S. Cl.
CPC .......... *F22B 37/38* (2013.01); *G01N 27/041* (2013.01); *G01N 27/20* (2013.01)

(58) Field of Classification Search
CPC ........ F22B 37/38; G01N 27/041; G01N 27/20
See application file for complete search history.

(56) References Cited

U.S. PATENT DOCUMENTS

| | | | |
|---|---|---|---|
| 3,721,897 A | 3/1973 | Edling | |
| 6,288,528 B1* | 9/2001 | Goodstine | G01N 27/20 324/693 |
| 6,909,816 B2 | 6/2005 | Kychakoff et al. | |
| 8,046,191 B2 | 10/2011 | Jammu et al. | |
| 8,442,853 B2 | 5/2013 | Abbott | |
| 9,491,412 B2 | 11/2016 | Ferry et al. | |
| 9,638,652 B2 | 5/2017 | Ghods et al. | |
| 10,047,956 B2 | 8/2018 | Strelec et al. | |
| 10,151,220 B2* | 12/2018 | Imran | H01L 35/30 |
| 2003/0055586 A1 | 3/2003 | Mills, Jr. | |
| 2004/0130340 A1 | 7/2004 | Tiefnig | |
| 2014/0306726 A1* | 10/2014 | Miyazaki | G01N 17/04 324/700 |
| 2014/0354307 A1* | 12/2014 | Clarke | G01N 27/20 324/700 |
| 2016/0356677 A1 | 12/2016 | Bollas et al. | |
| 2018/0003615 A1* | 1/2018 | Kessler | G01N 27/04 |
| 2019/0323980 A1* | 10/2019 | Yungers | G01N 27/20 |

FOREIGN PATENT DOCUMENTS

| | | |
|---|---|---|
| JP | 06147404 | 5/1994 |
| KR | 101528810 | 6/2015 |
| WO | 2022009097 | 1/2022 |

OTHER PUBLICATIONS

PCT International Search Report dated Aug. 5, 2022 from corresponding International Application No. PCT/US2022/070340 filed Jan. 25, 2022.

* cited by examiner

*Primary Examiner* — Feba Pothen
(74) *Attorney, Agent, or Firm* — Grogan, Tuccillo & Vanderleeden, LLP

(57) ABSTRACT

A method and system of assessing a condition of a boiler is disclosed. The assessing of the condition of the boiler establishes a baseline resistivity of a boiler waterwall for a first location of the boiler waterwall under a known temperature condition. A resistivity of the first location is measured under another temperature condition. The measured resistivity for the first location is compared to the baseline resistivity. A condition of the waterwall of the boiler is determined based on the comparison.

18 Claims, 4 Drawing Sheets

$$\rho = \frac{V}{I}\frac{wt}{L} \, \Omega-cm$$

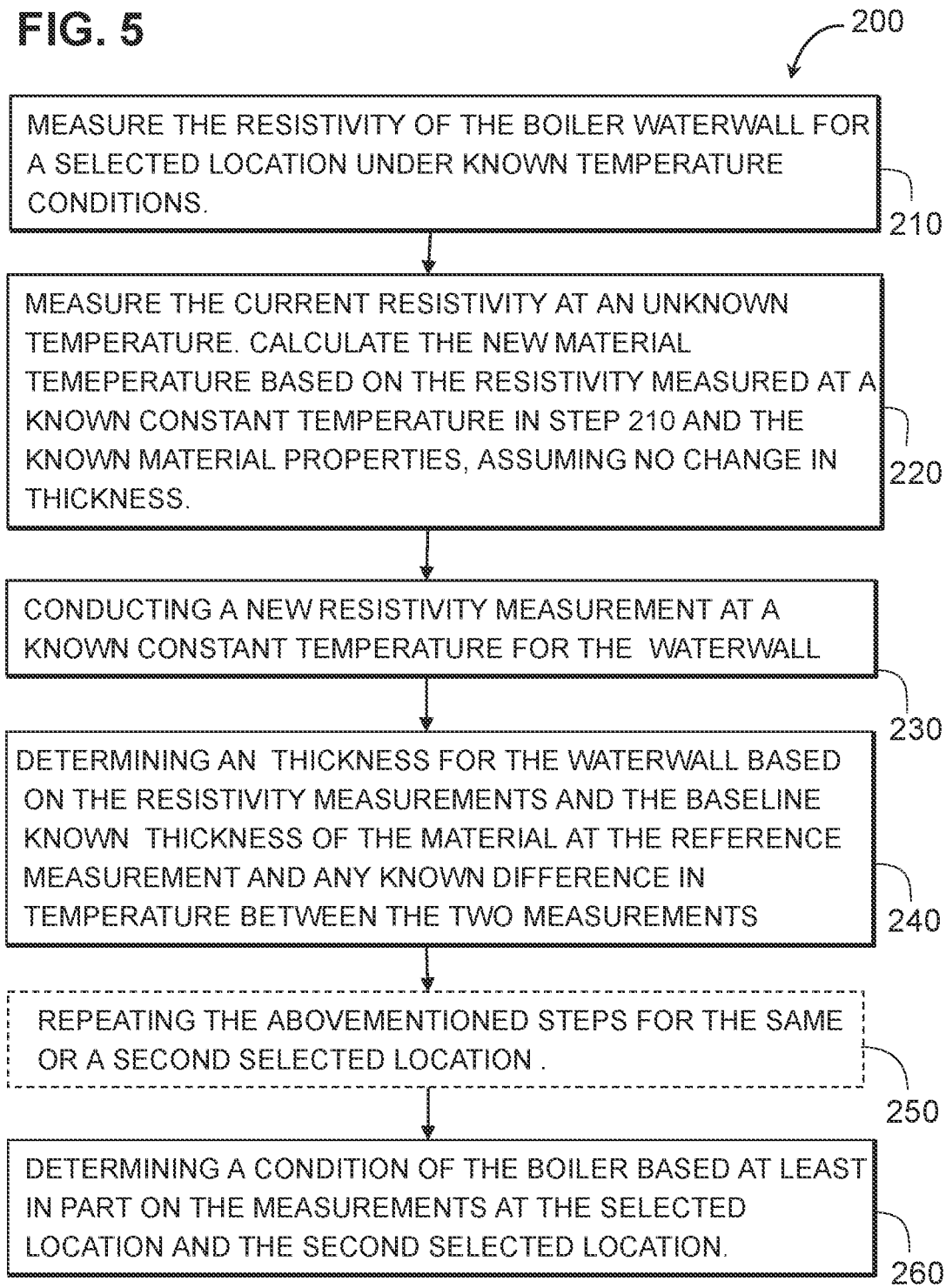

METHOD AND SYSTEM FOR ASSESSING A CONDITION OF A BOILER

BACKGROUND

Technical Field

Embodiments, as described herein, generally relate to evaluation methods and systems for monitoring the operation of combined cycle power plants and boilers for steam power plants. More particularly, described herein are a system and method for assessing a condition of a boiler, namely, the presence of slag buildup and corrosion on a waterwall of the boiler.

Discussion of Art

A boiler typically includes a furnace in which fuel is burned to generate heat to produce steam. The combustion of the fuel creates thermal energy or heat, which is used to heat and vaporize a liquid, such as water, which makes steam. The generated steam may be used to drive a turbine to generate electricity or to provide heat for other purposes. Fossil fuels, such as pulverized coal, natural gas, and the like are typical fuels used in many combustion systems for boilers. When combusting the fuel, heat is generated, and soot, bottom ash, and flue gases are formed.

The walls of a combustion vessel are frequently made up of a series of heat exchange tubes filled with a heat exchange medium (typically water or steam) and may be referred to as a "waterwall." Minerals may accumulate on the inside surface of the water tubes forming a layer referred to as boiler scale. The boiler scale impedes the transfer of heat from the combustion vessel wall to the heat exchange medium, impairing the efficiency of the boiler. Heat accumulates in the combustion vessel, raising the operational temperature of the wall of the combustion chamber. Higher operating temperatures may dangerously weaken the wall of the combustion chamber, resulting in premature failure.

One side of the waterwall faces the combustion chamber and is exposed to the products of combustion, which may include hot gases, ash, and corrosive combustion by-products. Combustion of fuels such as coal results in soot and ash deposits on the inside surface of the waterwall, impairing heat transfer from the heated gases in the combustion vessel to the water tubes. The coating of ash or slag on the combustion vessel wall impairs efficiency and must, therefore, be periodically removed. The wall of a combustion vessel can corrode over time as a result of corrosive materials in the hot gases and the ash deposited by the fossil fuel consumed or physical degradation caused by, for example, solid waste consumed in a trash-to-energy plant. This corrosion reduces the wall thickness of the tubes. The walls of a combustion vessel must be maintained at a minimum thickness to reliably withstand the high pressure in the water tubes.

Proper maintenance of the combustion vessel typically requires periodic shutdown for inspection, cleaning, and repair of critical components. If the expenses associated with plant shutdown are to be avoided without compromising safety, physical and operational conditions within the combustion vessel must be carefully monitored and evaluated to detect dangerous conditions. For these reasons, it would be desirable to provide non-intrusive on-line monitoring systems which evaluate the physical characteristics of critical portions of the combustion vessel itself to determine the temperature, heat flux, and thickness of that portion of the combustion vessel.

One possible monitoring approach could be based upon known physical laws as they relate to the material (typically carbon steel) that the combustion vessel walls and water tubes are constructed from. For example, the electric resistance in a conductor is proportional to the length of the conductor and inversely proportional to its cross-sectional area. The resistivity of a conductor increases according to known laws with the temperature of the conductor. The term resistivity as used herein refers to the "sheet resistivity" and is defined as the electrical resistance offered by a material to the flow of current, times the cross-sectional area of current flow and per unit length of the current path, or the reciprocal of the conductivity. The term "sheet resistivity" for a two-dimensional slab is defined as the resistivity per unit thickness of the material.

It is known, for example, as disclosed in U.S. Pat. No. 3,721,897 to pass a constant current through a portion of the combustion chamber wall and measure the voltage drop across a known length of the wall. The resistance of that portion of the combustion vessel wall can be calculated using the constant current and measured voltage. Measurements taken during combustion vessel operation are compensated for temperature and compared to a baseline resistance measurement. Increased resistance indicates a decreased area of the combustion vessel wall. If the resistance increases beyond a predetermined point, an unsafe condition, i.e., severe thinning of the waterwall, is indicated, and an unscheduled shutdown is justified. On the other hand, on-line monitoring may extend the period between scheduled shutdowns by indicating the plant is operating normally.

Another approach is to employ heat flux sensors embedded into the boiler waterwalls to measure the heat flux from the fireball into the waterwall, indicating whether this section of the waterwall is clean or dirty. After cleaning, that section of the waterwall will typically show a higher heat flux. In such an approach, a small heat flux sensor recording the heat flux through less than 1 square inch of tubing is used to measure the cleanliness of a section of the waterwall many feet wide and tall. However, this process can become ineffective when the ash or slag on the waterwall is uneven, which results in the heat flux sensor giving an inaccurate picture of the waterwall cleanliness. If the heat flux sensor reads lower than the average value for that section, then the waterwall will be cleaned too frequently, possibly leading to erosion or thermal stress cracking when water cannons are used for cleaning. If the heat flux sensor reads higher than the average value for that section, then the slag may sinter to the waterwall, making it difficult or impossible to remove through standard on-line cleaning methods. Heat flux sensors are also relatively fragile due to the tiny thermocouple wires embedded into a section of a waterwall tube. Replacing a heat flux sensor requires cutting out the existing sensor and welding in a new sensor. The butt welds used to install a heat flux sensor may be compromised in some instances, leading to tube leaks and potentially, a forced boiler shutdown. Despite these know issues, heat flux sensors are still the most widely used method for controlling waterwall cleaning.

Another approach employed to provide a non-intrusive system capable of making area-averaged temperature measurements of waterwall tubes is referred to as Electrical Resistance Mapping (ERM). ERM combined the concept of 4-wire electrical resistance measurement, mathematical reconstruction of a grid of resistance measurements from a limited number of current injection points, and an algorithm using known and measured properties of the waterwall to calculate the average metal temperature around each location in a grid of sensor locations. U.S. Pat. Pub. No. 2003/0055586, which is hereby incorporated by reference herein, describes a method that includes a regularization model which, when applied to data collected from a two-dimensional grid of substantially equally spaced nodes on a combustion vessel wall, results in a minimization of the level of error in calculations utilizing the data. More specifically, such a method of electrical resistance mapping utilizes a two-dimensional network of contact nodes arranged on the outside surface of the waterwall of a combustion vessel. A known current is iteratively imposed upon the network from a plurality of sources to a plurality of sinks. During each iteration of the current source/sink, voltage measurements are taken between each nodes in the network. These voltage measurements include data used in calculations to determine the physical characteristics, e.g., resistance or temperature, of that portion of the combustion vessel wall being evaluated.

With such an existing system, under ideal conditions, measurements can be made with an accuracy, which will result in reliable indications of the physical and operational condition of the combustion vessel. However, given the limited accuracy of measuring devices and fluctuations in operating conditions within the boiler, high power levels and current levels are commonly required to achieve acceptable measurements. Moreover, issues with noise (electrical noise, process variations, and artifacts of the mathematical reconstruction algorithm) have been found to limit the accuracy and/or coverage area of the ERM system. In addition, some boilers, in particular, subcritical boilers have a smaller change in average waterwall temperature as the heat flux increases because the back sides of the tubes are always at saturation temperature. As a result, the smaller changes in heat flux, which has hindered the practical application of the ERM system/method on such boilers. Still further, the wiring necessary to implement the ERM system, which is often stretched across the boiler waterwall, can obstruct access to other boiler components or become damaged when accessing such components for repair.

In view of the above, there is a need for a system and method for noninvasively and accurately assessing a slag buildup, corrosion, and erosion condition of a boiler that obviates the logistical and practical issues associated with existing methods.

BRIEF DESCRIPTION

In an embodiment, described herein is a method of assessing a condition of a boiler. The method includes: establishing a baseline resistivity of a boiler waterwall for a first location of a plurality of locations of the boiler waterwall under a known temperature condition; measuring a resistivity for the first location of the plurality of locations of the boiler wall under another temperature condition; comparing the measured resistivity for the first location to the baseline resistivity for the first location; and determining a condition of the waterwall of the boiler based on the comparison.

In another embodiment, a system for assessing a condition of a boiler includes a resistivity sensing module electrically connected to a cold side of a waterwall of a boiler at a first location selected from a plurality of locations along the cold side of the waterwall. The resistivity sensing module is configured to apply a known current to the waterwall via a first pair of leads, and measure a voltage induced by the application of the current via a second pair of leads. The system also includes a control unit in communication with the resistivity sensing module, wherein at least one of the resistivity sensing module and the control unit are configured to determine a condition of the waterwall of based at least in part on the measured voltage.

In yet another embodiment, a system for assessing a condition of an interior wall of a passageway includes a resistivity sensing module electrically connected to an exterior wall of the passageway, the resistivity sensing module including a power source, a processor, and a four-wire sensor system including a first pair of leads electrically connected to the exterior wall of the passageway and a second pair of leads electrically connected to the exterior wall of the passageway at a location spaced from the first pair of leads, the resistivity sensing module being configured to apply a known current to the exterior wall of the passageway via the first pair of leads, and measure a voltage induced by the application of the current via the second pair of leads, and a control unit in communication with the resistivity sensing module, wherein at least one of the resistivity sensing module and the control unit are configured to determine the condition of the interior wall of the passageway of based at least in part on the measured voltage.

DRAWINGS

The described embodiments will be better understood from reading the following description of non-limiting embodiments, with reference to the attached drawings, in which:

FIG. 5 is a flow chart illustration of boiler wall temperature determination in accordance with an embodiment.

DETAILED DESCRIPTION

Figure 1:
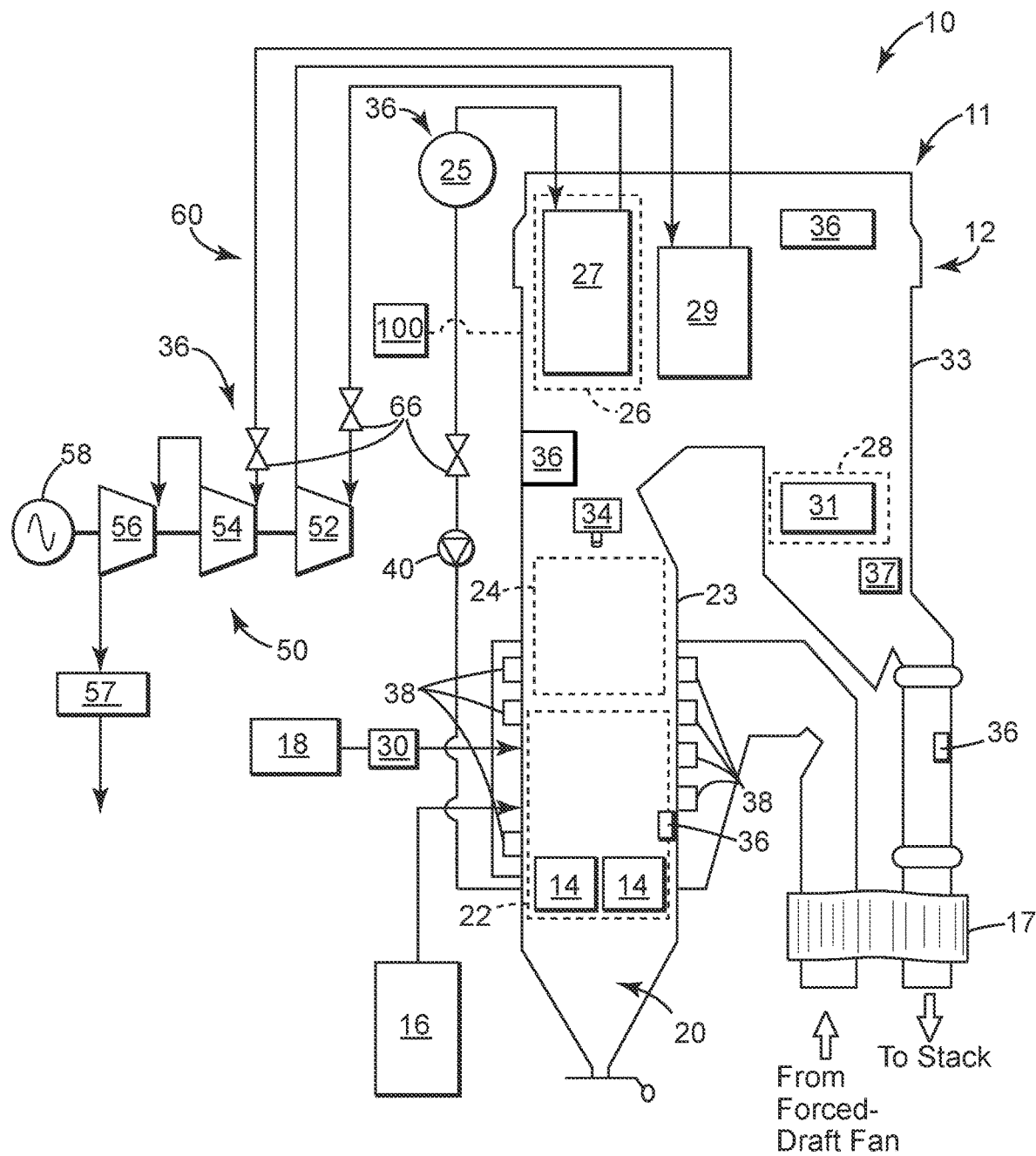
FIG. 1 is a simplified schematic illustration of a power generation system with a boiler in accordance with an embodiment.

Reference will be made below in detail to exemplary embodiments as described herein, examples of which are illustrated in the accompanying drawings. Wherever possible, the same reference characters used throughout the drawings refer to the same or like parts. While the various embodiments described herein are suitable for use with all power generation systems, the descriptions herein relating generally to a pulverized coal boiler such as for use in a pulverized coal power plant has been selected and described for clarity of illustration. Other systems may include different types of boilers, furnaces, and fired heaters utilizing a wide range of fuels, including, but not limited to, coal, oil, and gas. For example, contemplated boilers may include, but are not limited to, both T-fired and wall fired pulverized coal boilers, circulating fluidized bed (CFB) and bubbling fluidized bed (BFB) boilers, stoker boilers, waste-to-energy boilers, and suspension burners for biomass boilers. Moreover, such boilers may include controlled circulation, natural circulation, and supercritical boilers and others employed in heat recovery steam generator systems.

Embodiments, as described herein, relate to a power generation system having combustion system and evaluation method and control scheme therefor that provides for evaluating data representing the electrical characteristics of a combustion vessel boiler. In particular, the described embodiments are related to applications utilized in determining temperatures of a boiler wall as may be correlated to soot and slag buildup on the waterwalls of the boiler or erosion of the surfaces for the boiler wall. It should be appreciated that while the embodiments herein are described with references to the waterwalls of boiler, such description is entirely for the purposes of illustration and should not be considered limiting. The described embodiments are equally applicable to any surfaces subject to corrosion, erosion, or where build-up of soot or slag can impact the performance of the material of the surface.

FIG. 1 illustrates a power generation system 10 having a combustion system 11 having a boiler 12 as utilized in power generation applications. The boiler 12 may be a tangentially fired boiler (also known as a T-fired boiler) or wall fired boiler. Fuel and air are introduced into the boiler 12 via the burner assemblies 14 and/or nozzles associated with the burner assemblies 14. The combustion system 10 includes a fuel source such as, for example, a pulverizer 16 that is configured to grind fuel such as coal to a desired degree of fineness. The pulverized coal is passed from the pulverizer 16 to the boiler 12 using primary air. An air-source 18 supplies secondary or combustion air to the boiler 12, where it is mixed with the fuel and then combusted. Where the boiler 12 is oxy-fired, the air source 18 may be an air separation unit that extracts oxygen from an incoming air stream or directly from the atmosphere.

The boiler 12 includes a hopper zone 20 located below a main burner zone 22 from which ash may be collected for subsequent removal. The bottom of the boiler 12 and hopper zone 20 is provided with a grid (not shown), for introducing combustion or suspending or fluidizing gas, (for bed-type boilers) called primary air or combustion air, and for removing bottom ash and other debris from the boiler 12. The boiler 12 also includes a main burner zone 22 (also referred to as a windbox), where the air and an air-fuel mixture is introduced into the boiler 12, and a burnout zone 24 where any air or fuel that is not combusted in the main burner zone 22 gets combusted. The boiler 12 also includes a superheater zone 26 with superheater 27 where combustion flue gases superheat the steam and an economizer zone 28 with an economizer 31 where water can be preheated prior to entering a mixing sphere or drum (25) to feed water to the waterwall 23. In the main burner zone 22, controlled flows of primary air, pulverized coal, and secondary air are introduced into the combustion system 10 to facilitate the formation therein of a rotating fireball. The rotating fireball is a combustion process of the type which results in the release of material that contributes to depositions on the fireside surfaces of the waterwall 23. Carbon-based combustion by-product builds up as slag and/or ash on the fireside surfaces of the waterwall 23. The boiler feedwater entering the economizer 31 originates from the steam turbine 50 and a condenser 57 downstream of the steam turbines 50. The condensate is first heated by steam by means of one or more low-pressure preheaters (not shown) before entering the economizer 31. Pumps 40 may be employed to aid in circulating water to the waterwall 23 and through boiler 12.

Combustion of the fuel with the primary and secondary air within the boiler 12 produces a stream of flue gases that are ultimately treated and exhausted through a stack downstream from the economizer zone 28. Often, the final step of collecting heat from the flue gases takes place in the combustion air preheater 17, where the flue gas heat is used to heat the air that is used as combustion air in the combustion system 11. The air preheater 17 is followed in the flue gas path by an electrostatic filter/precipitator or a bag filter (not shown) that separates any solid particles left in the flue gases before the flue gases are vented to the atmosphere via a stack. As used herein, directions such as "downstream" means in the general direction of the flue gas flow. Similarly, the term "upstream" is opposite the direction of "downstream" going opposite the direction of flue gas flow.

Generally, in the operation of the power generation system 10 and combustion system 11, the combustion of fuel in the boiler 12 heats water in the waterwalls 23 of the boiler 12 to generate steam. The heated steam and water passes through the steam drum (or equivalent), hereinafter referred to as drum 25 to the superheater 27 in the superheater zone 26 where additional heat is imparted to the steam by the flue gases. In a supercritical boiler, the water boils and turns to steam in the waterwalls 23, resulting in widely varying metal temperatures as the water/steam rises through the tubes of the waterwalls 23. The superheated steam from the superheater 27 is then directed via a piping system shown generally as 60 to a high-pressure section 52 of turbine 50, where the steam is expanded and cooled to drive a turbine 50. The turbine 50, thereby, turns a generator 58 to ultimately generate electricity. The expanded steam from the high-pressure section 52 of the turbine 50 may then be returned to a reheater 29, downstream in the flue gases from the superheater 27 to reheat the steam. The reheated steam is then directed to an intermediate pressure section 54 of turbine 50, and ultimately a low-pressure section 56 of the turbine 50 where the steam is successively expanded and cooled to further drive the turbine 50.

As further illustrated in FIG. 1, the combustion system 11 includes an array of sensors, actuators, and monitoring devices to monitor and control the combustion process and the resulting consequences associated with boiler operation. For example, temperature and pressure monitors shown generally and collectively as 36 are used throughout the system to ensure proper control, operation and ensure that operational limits for the boiler and combustion are not exceeded. In another example, the combustion system 11 may include a plurality of fluid flow control devices 30 that supply secondary air for combustion to each fuel introduction nozzle associated with the burner assemblies 14. In an embodiment, the fluid flow control devices 30 may be electrically actuated air dampers and the like that can be adjusted to vary the amount of air provided to each fuel introduction nozzle associated with each burner assembly 14. The boiler 12 may also include other individually controllable air dampers or fluid flow control devices 30 at various spatial locations. Each of the flow control devices 30 is controllable by a control unit 100 to ensure that desired air/fuel ratios and flame temperatures are achieved for each nozzle location.

FIG. 1 also illustrates that the backpass 33 of the boiler 12 downstream from the superheater 27 and reheater 29. Economizer 31 in economizer section 28 is fitted with a monitoring device 37. The monitoring device 37 may optionally be configured for measurement and assessment of gas species such as carbon monoxide (CO), carbon dioxide ($CO_2$), mercury (Hg), sulfur dioxide ($SO_2$), sulfur trioxide ($SO_3$), nitrogen dioxide ($NO_2$), nitric oxide (NO) and oxygen ($O_2$) within the backpass 33. $SO_2$ and $SO_3$ are collectively referred to as SOx. Similarly, NO$_2$ and NO are collectively referred to as NOx.

Continuing with the operation of the boiler 12, a predetermined ratio of fuel and air is provided to each of the burner assemblies 14 for combustion. As the fuel/air mixture is combusted within the furnace and flue gases are generated, the combustion process and flue gases are monitored. In particular, various parameters of the fireball and flame, conditions on the walls of the furnace, and multiple parameters of the flue gas are sensed and monitored. These parameters are transmitted or otherwise communicated to the combustion control unit 100, where they are analyzed and processed according to a control algorithm stored in memory and executed by a processor. The control unit 100 is configured to control the fuel provided to the boiler 12 and/or the air provided to the boiler 12, in dependence upon the one or more monitored combustion and flue gas parameters and furnace wall conditions. In addition, the power generation system 10 may include a plurality of fluid flow control devices 66, that control the flow of water or steam in the system 10. In an embodiment, the fluid flow control devices 66 may be electrically actuated valves that can be adjusted to vary the amount of flow therethrough. Each of the flow control devices, e.g., 66, is individually controllable by a control unit 100.

In addition to the sensors and monitoring devices 36, 37 disclosed above, the combustion system 11 may also include a system for monitoring or assessing a condition of the boiler 12 and, in particular, the presence of slag buildup and/or corrosion on a waterwall 23 of the boiler 12. Electrical resistance mapping via integrated sensor modules 38 distributed on the surfaces of the waterwall 23 facilitate the assessment as described herein. As disclosed above, carbon-based combustion by-product often builds up as slag and/or ash on the fireside surfaces of the waterwall 23, inhibiting heat transfer from the combustion chamber to the water carried in the waterwall 23. Corrosion can also be particularly deleterious to the components of the boiler 12. Corrosion is primarily the direct result of the combustion by-products of the fuels employed. In particular, gas species such as SOx, Chlorine, and the like, generated from fossil fuels and solid waste fuels, can be particularly corrosive. It will be understood by one of ordinary skill in the art that certain combustion vessels, such as those fired by natural gas, do not corrode or waste in the manner of a combustion vessel fired by coal or solid waste. Therefore, the area of a segment of a combustion vessel waterwall between nodes in a natural gas-fired combustion vessel, as compared to a segment of a combustion vessel waterwall of a fossil fuel-fired combustion vessel, will remain substantially constant over time. As a result, fluctuations in measured voltages for resistance measurement techniques in a natural gas fired combustion vessel will be substantially related to the increased resistance of the segment resulting from temperature changes. In calculations for this type of combustion vessel, i.e., natural gas fired, the area of the segment between nodes is known, and the resulting fluctuations in the calculated resistance of the segment can be transformed according to known relationships into an accurate measure of the temperature of the segment.

On the other hand, in a solid-waste or coal-fired combustion vessel, corrosion or wastage of the walls of the combustion vessel occurs with regularity. Under such conditions, both the temperature and the area of the evaluated segment of the combustion vessel produce changes in measured voltage between nodes when employing resistance measurements. Under these circumstances, the temperature is measured separately to eliminate multiple variables in the calculations. Following compensation for changes in temperature (which are known), changes in calculated resistances may then be attributed to changes in the cross-sectional area, e.g., thickness, of the evaluated portion of the combustion vessel.

Figure 2:
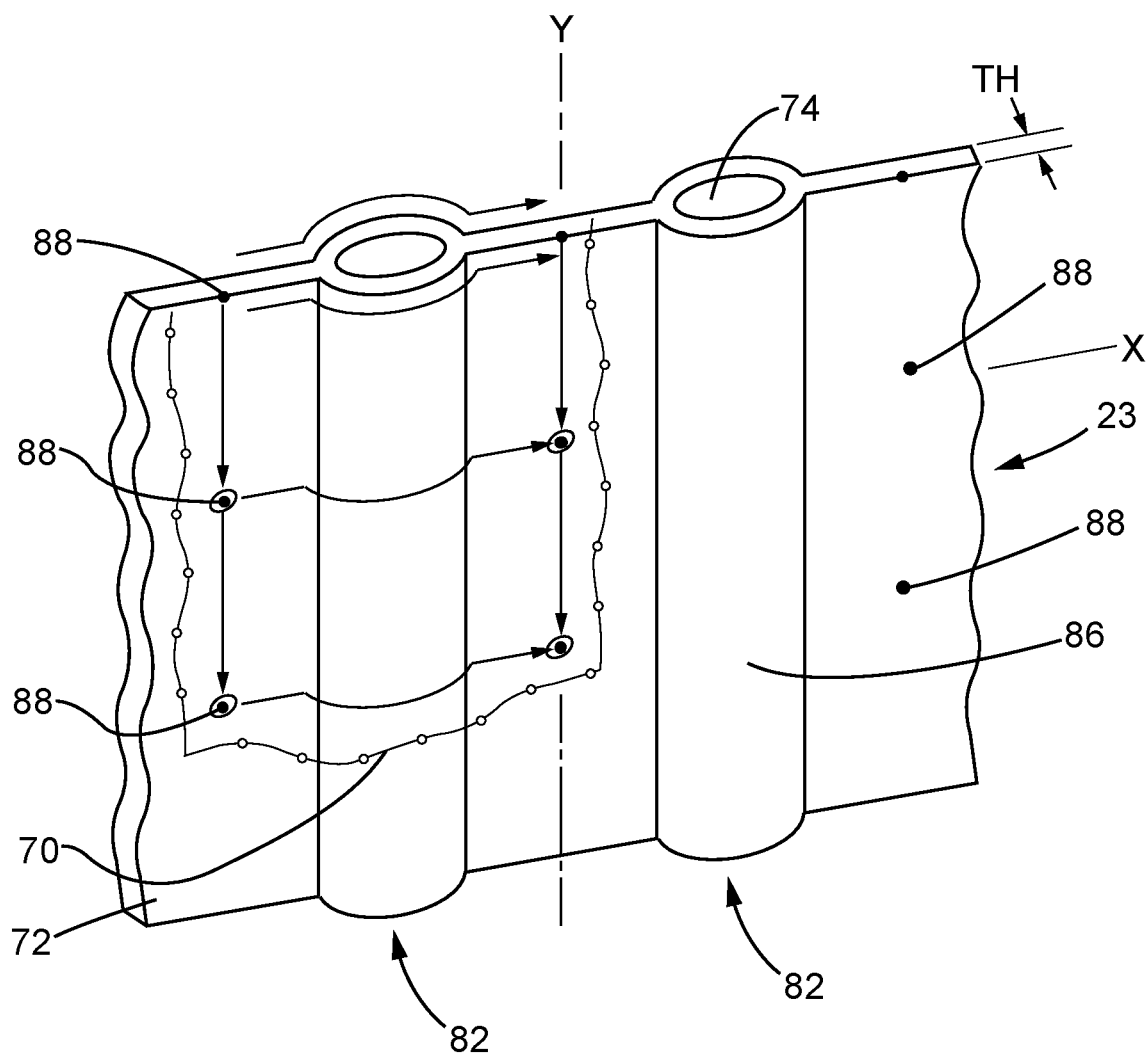
FIG. 2 is an illustration of a section of a boiler waterwall and grid layout in accordance with an embodiment.

In connection with the above, FIG. 2 depicts a portion of interest of a waterwall 23 of the boiler 12 shown in FIG. 1. The waterwall 23 includes individual water tubes 82 laid side by side connected by webs of material as illustrated. The waterwall 23 has an inner facing surface 86 that faces the interior of the boiler 12. A plurality of nodes 88 forms a matrix 70 arranged on the outside surface 72 of the waterwall 23 such that these nodes 88 are not directly exposed to the radiation heat and other thermal conditions to which the inner facing surface 86 of the waterwall 23 is exposed by virtue of its direct exposure to the combustion of fossil fuel in the boiler 12. For example, the inner facing surface 86 of the waterwall 23 can be exposed to temperatures in excess of 900° C. (900 degrees C.). The nodes 88 need not be in the form of additional physical structures on the waterwall 23 but can, instead, be designated locations on the waterwall 23. The nodes 88 are locations on the waterwall 23, schematically shown as circles. The matrix 70 can be any arbitrarily designated arrangement of nodes 88 and need not be physically delimited by any defined structure of the waterwall 23 but can facilitate mapping out the application of test points over the waterwall 23. Thus, the matrix 70 is schematically shown in FIG. 2 in broken lines. The water tubes 82 in the illustrated embodiment are oriented substantially parallel to the Y-axis and include an interior surface 74. Nodes 88 are, for purposes of simplicity and computation, effectively, equidistantly spaced, though not necessarily, from one another in the X and Y directions, forming a two-dimensional matrix. The term "effectively equidistantly spaced" is to be understood as encompassing both the situation in which the respective nodes of adjacent pairs of the nodes 88 are at a uniform spacing from one another as well as when the nodes 88 are not physically equidistant from one another. Nonetheless, their relationships can be mathematically adjusted so that, for purposes of calculation, they behave as equidistantly spaced nodes. In other words, even if the nodes are not equidistant, the differences may readily be compensated mathematically. In an embodiment, sensor modules 38 are arranged along the waterwall 23 at the nodes as described above to formulate the matrix 70, as discussed herein. While the nodes 88 are depicted as spaced relatively close together, and between water tubes of the water wall 23, such depiction is merely for illustration. The nodes 88 may be placed as needed to make the electrical resistance measurements and, in some embodiments, are likely to be spaced significantly further apart than shown in FIG. 2. In some embodiments, the nodes 88 may be a significant distance apart. For example, in some embodiments, each measurement node 88 is likely to be at least 10 to 20 water tubes 82 apart (e.g., on the order of many inches or feet) horizontally and a few feet apart vertically. The nodes 88 also need not be centered on the fin bars as depicted and may be placed on the water tubes 82.

Figure 3:
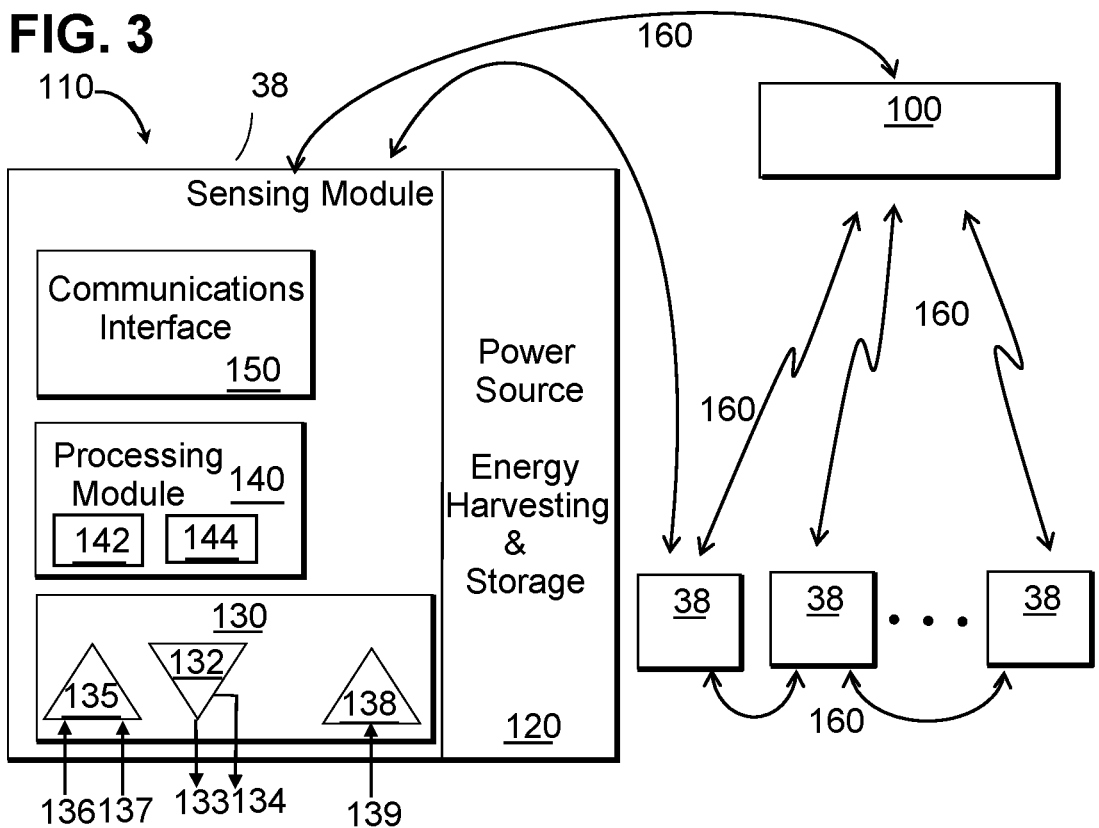
FIG. 3 is a schematic illustration of four-wire resistivity determination in accordance with an embodiment.

FIG. 3 depicts an example conductivity/resistivity sensor module 38 for monitoring or assessing a condition of the boiler 12 and, in particular, the presence of slag buildup, corrosion, and/or erosion on a waterwall of the boiler 12, as may be utilized in one or more exemplary embodiments. In particular, in an embodiment, a conductivity sensor module 38 is developed that facilitates connections and measurements at locations distributed in a grid 70 of sensor locations (nodes 88) on the waterwall 23.

Figure 4:
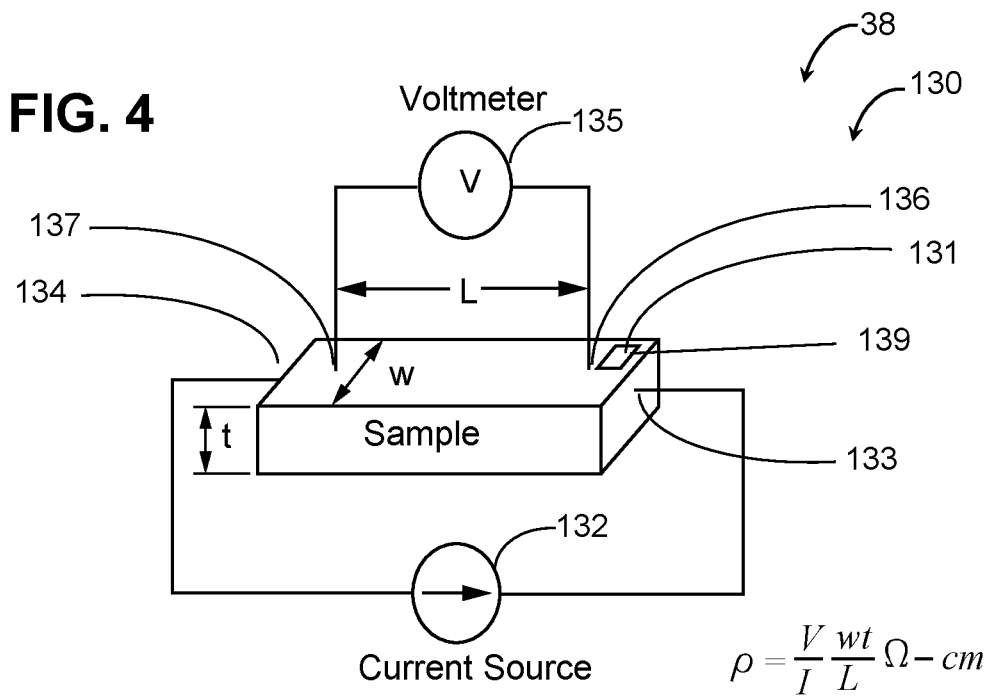
FIG. 4 is a schematic illustration of a four-wire sensor module in accordance with an embodiment.

FIG. 4 depicts the basic concept of 4-wire measurements for material conductivity/resistivity, where a known electrical current is applied to the material via two wires, leads, or contact points a known distance apart. In an embodiment, a voltage is measured across the known distance of the material with two additional wires, leads, or contact points. It should be appreciated that by applying the equation depicted in FIG. 4, a resistivity can be calculated for known, stable temperatures.

Continuing with FIGS. 3 and 4, the described embodiments combine the concept of a distributed 4-wire electrical resistance measurement and temperature measurement, simplified mathematical construction of a grid of resistance measurements for a given temperature from a selected number of low current injection points, and an algorithm using known and measured properties of the waterwall 23 to calculate the average metal temperature around each location distributed in a grid of sensor module 38 locations on the waterwall 23. This system is also capable of measuring area-averages of metal loss in the waterwalls 23 by comparing resistance measurements taken at known, stable temperatures. All mechanical and electrical connections are made from the outside ("cold" side) of the waterwall 23, where they are not subject to damage from slag, erosion, or the boiler fireball. In an embodiment, the 4-wire resistance measurement concept is deployed in conductivity/resistivity sensing module 38 at multiple locations distributed on the waterwall 23 (FIG. 1), e.g., at nodes 88. Advantageously, this approach reduces any necessary wiring, reduces the electrical power needed to make a resistance measurement, and reduces several sources of measurement noise.

Continuing with FIG. 3, in an embodiment, an example of a system 110 for monitoring or assessing a condition of the boiler 12 and, in particular, the presence of slag buildup and/or corrosion on a waterwall of the boiler 12, based on resistivity sensing is depicted. In an embodiment, the sensing module 38 may include a power source 120, the four-wire sensor system 130, processing module 140, and a communications interface 150. In an embodiment, a power source 120 is integrated into the module 38, including a mechanism for local power generation or energy harvesting, conditioning, and storage. For example, in one embodiment, heat energy may be locally captured from the boiler waterwalls 23, which, in operation, may operate as an excellent source of heat. Heat energy may be converted to electricity using Pelletier thermoelectric devices. For example, off-the-shelf modular products on the order of about a two-inch cube can provide as much as 60 watts of power. Other approaches for energy harvesting may include radio frequency (RF), photonic, or dynamic energy capture and storage devices. In an embodiment, the power source may include conditioning and various forms of energy storage systems such as a capacitor or rechargeable battery.

Continuing with FIGS. 3 and 4, the sensing module 38 may also include a four-wire sensing device 130. The four-wire sensing device 130 includes, but is not limited to, a current source 132 operable to provide source current via leads 133 and 134 to enable the conductivity/resistivity measurement, and a voltage measurement device 135 operable to measure the voltage at leads 136 and 137. The current source 132 and voltage measurement device 136 may include any necessary electronics and the like to facilitate their integration in the sensing module 38. Sensing module 38 and sending device 130 may also include an interface 138 via line 139 to one or more separate temperature measurement devices 131, for example, a thermocouple. Temperature sensing devices 131 are used by the sensing module 38 to determine a temperature difference from a reference reading (e.g., a baseline temperature and resistance) when calculating the reduction in material thickness. The temperature range (e.g., room temperature) and temperature history can also be used to determine if the waterwall is likely to be at a constant temperature where thickness measurements are possible.

The processing module 140 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the processing module may include at least one processor 142 and system memory/data storage structures 144, which may include random access memory (RAM) and read-only memory (ROM). The at least one processor 142 of module 140 may include one or more conventional microprocessors, microcontrollers, and one or more supplementary co-processors such as math co-processors, or the like. The data storage structures discussed herein may include an appropriate combination of magnetic, optical, and/or semiconductor memory, and may include, for example, RAM, ROM, flash drive, an optical disc such as a compact disc and/or a hard disk or drive. The processing module 140 may be implemented as an integrated microcontroller where each of the functions may be integrated into a single package.

Moreover, the sensing module 38 may be implemented as a microcontroller, including ASIC or FPGA as needed to interface with various modules to implement the functionality, processing, and communications described herein. Additionally, a software application that adapts the controller 140 to perform the methods disclosed herein may be read into a main memory of the at least one processor 142 from a computer-readable medium. Thus, embodiments of the present invention may perform the methods disclosed herein in real-time. The term "computer-readable medium," as used herein, refers to any medium that provides or participates in providing instructions to the at least one processor 142 of module 38 (or any other processor of a device described herein) for execution.

Continuing with FIG. 3, in an embodiment, a low powered communications interface 150 is utilized in the sensing module 38. The communications interface 150 is configured to interface with an interconnect/network 160, which interconnects the sensor modules 38 and one or more controllers such as control unit 100. The network 160 may be a mix of wired and wireless components and can leverage the communications networks, including an IP network. It should be understood that the interconnect/network 160 may include wired components or wireless components, or a combination thereof. Such wired components may include regular network cables, optical fibers, electrical wires, or any other type of physical structure over which the sensing modules 38, control 100, and other devices of the boiler system can communicate. In addition, the interconnect 160 may include wireless components and may include radio links, optical links, magnetic links, sonic links, or any other type of wireless link over which the sensing modules 38\ and control unit 100 can communicate.

The communications interface 150 may be wired or wireless or a combination thereof. In an embodiment, a wireless communications interface 150 and wireless network 160 are used. For example, the communications interface 150 may employ various techniques, technologies, and protocols to facilitate the implementation of the described embodiments and are in no way limiting. For example, the communications interfaces 150 and network 160 could be implemented as Ethernet, WiFi®, Bluetooth®, NFC, and the like. The network 160 may be implemented with a hub and spoke type construct or as a mesh network construct. In some embodiments, a wireless mesh network may be utilized to permit a grid array, e.g., 70 of sensor modules 38 deployed around a boiler 12 waterwall 23 to communicate with each other, coordinate measurements, and pass data back to a control unit 100. Advantageously, combining a wireless local power source 120 with a wireless communication interface 150 and network 160 significantly reduces the installation cost for each sensing module 38 and the whole system, while simultaneously avoiding some of the constraints of earlier systems. Each sensing module 38 can be deployed using four pins corresponding to the 4-wire leads, attached to the outside of the boiler wall, one or more independent temperature measurement devices such as thermocouples, plus one larger connection for good thermal connection to the waterwall 23 of the boiler 12 to support the electronics of module 38 and provide heat to the Pelletier device of the power source 120 (if employed for energy harvesting) as may be used to power the sensor module 38 including the four-wire sensor system 130 and temperature sensor 131 and interface 138. In an embodiment, spot welding may be used to attach the leads to the waterwall 23. However, other means of low resistance connection are possible, including welding, brazing, bolting, screwing, and soldering, and even epoxy adhesives may under some conditions be utilized.

It should be appreciated that while the monitoring system 110, and more specifically, integrated conductivity/resistivity sensing module 38 is described as including separated modules for a power source 120, the four-wire sensor system 130, the processing module 140, and a communications interface 150, such description is merely illustrative. In one or more embodiments, the functionality of all or some of the described modules may readily be integrated or combined as needed. For instance, in an embodiment, the functionality of the four-wire sensor system 130, processing module 140, and communications interface 150 may be integrated entirely or partly into a microcontroller, ASIC, FPGA, and the like.

In the described embodiments, the system 110, and more specifically, each sensing module 38 distributed in the grid 70 as described herein, measures the resistivity of the boiler waterwall 23 for a selected location and compares the measured current resistivity to the resistivity (or resistivities) measured at a known constant temperature to establish a known baseline for the waterwall 23. Using a correlation of the electrical resistivity versus temperature for the waterwall alloy, the temperature (or change in temperature) is calculated based on the difference(s) in resistivity. Such an approach assumes that the waterwall material thickness is unchanged (e.g., due to erosion). Subsequently, to evaluate thickness loss measurements (as may be manifested as a result of corrosion), a new resistivity measurement is completed at a known combustion chamber constant temperature. The measurements may then be compensated for any change in resistivity due to temperature differences between the reference and current readings. Finally, any resultant change in resistivity is attributed to material loss (or gain), and the new average thickness is calculated based on the known thickness of the material at the reference measurement.

It should be appreciated that prior systems, such as that described in U.S. Pat. Pub. No. 20030055586, used four current injection points spread across a large area of waterwall. Unfortunately, this injection technique required relatively high power (50 to 180 Amps) to provide sufficient voltage readings across an 11×11 voltage measurement grid, to achieve usable measurements. In either of the above-described circumstances, due to well-known problems of accuracy and anomalies of conductivity measurements under operational conditions, the collected data inherently contains errors. Furthermore, the problem of inverting the measured voltages (as part of the computation) into calculated resistivities using Kirchoff's law or its extension to zero-line integrals poses mathematical challenges, i.e., small changes in measured voltages can produce substantial changes in calculated resistivities resulting in computational difficulties. Thus, measurement error that would otherwise be acceptable is amplified by the form of the calculation, typically leading to calculated resistivities having oscillatory behavior.

Advantageously, separating the measurements into a series of localized four-wire measurements (two current injection points, two voltage measurement points) provides useable voltage readings with much lower injected current. Furthermore, in an embodiment, steps are taken to ensure that current simultaneously injected in more than one location on the waterwall does not influence other voltage readings by other sensing modules 38, particularly for those in the vicinity of the current injection and measurement. For example, in an embodiment, the separate 4-wire measurements from selected sensing modules 38 across the matrix 70 may be coordinated or scheduled (e.g., by the control unit 100) so that only one measurement is in progress at any time, or one measurement in a given area on the waterwall 23 is made at a time. In an embodiment, the control unit 100, via the network 160, may be utilized to coordinate the operations and measurements at each sensor module 38 (to avoid influence between measurement locations). The wireless network 160 will also be used to transmit measurement values back to the control unit 100, as well as send any measurement or calibration commands from the control unit 100 to the sensors or sensor module 38. Similarly, in another embodiment, lead-wires, e.g., 133, 134, 136, 137 on the four-wire module 38 are of a similar alloy to that of the waterwall 23 (or whatever material is being measured). Such a configuration aids in eliminating extraneous voltages caused by the thermocouple effect, which creates increasing voltages at increasing temperatures where two dissimilar metals are joined together. Using a similar alloy for module 38 eliminates these thermocouple voltages and provides more accurate voltage measurements.

Turning now to FIG. 5, a method 200 for monitoring slag buildup and/or the loss of material thickness due to erosion or corrosion on the waterwall 23 of a boiler 12 is illustrated. The method initiates with measuring the resistivity of the boiler waterwall 23 for a selected location at an established or known temperature, as depicted at process step 210. The measurement at a known temperature enables establishing a baseline resistivity for the selected location. As depicted at process step 220, under operational conditions, a new resistivity measurement is taken. The newly measured resistivity is compared to a baseline resistivity established at a known or constant temperature for the waterwall 23, at that selected location, (as depicted in process step 210). The current average temperature of the material is calculated using the change in resistivity from the previous measurement taken under known conditions. In an embodiment, optionally, an independent temperature measurement of the waterwall temperature is made to verify that it is relatively constant around the measurement area and relatively constant over time. If relatively constant, the resistance measurements are completed. If these pre-tests fail, the resistivity measurement depicted in process steps 220 and 230 may be aborted because the conditions are not suitable for a new measurement (e.g., boiler water wall 23 temperatures are changing). As depicted in process step 240, calculate the change in material thickness from the change in resistivity compared to the baseline temperature, resistivity, and thickness measured in process step 210.

The method 200 continues at process step 230; subsequently, a new resistivity measurement is completed at a known stable temperature. As depicted at process step 240, an average thickness for the waterwall 23 may be determined based on comparing the new resistivity measurement from step 230 to the baseline resistivity measurement for the baseline thickness, and the known temperature of the material at the reference measurement from step 210 of the process. In some instances, the baseline thickness may be known or based on a specification for the waterwall, pipe, and the like. In other instances, the baseline thickness is computed/imputed from the initial measurements. The method 200 continues with optionally repeating the above-mentioned steps for a second selected location as depicted at process step 250. Finally, as depicted at process step 260, the method 200 continues with determining a condition of the boiler based at least in part on the measurements at the selected location and optionally, the second selected location. It should be appreciated that while various steps of the method 200 are depicted in a particular order, they need not be, and are described in such order merely to illustrate the examples of the embodiments. Some steps may readily be conducted in a different order.

While the invention hereinbefore disclosed includes a plurality of sensor modules 38 that individually communicate with the control unit 100 for relaying data (e.g., electrical resistance, temperature measurements) thereto, in an embodiment, the system 110 may alternatively, or in addition, provide for communication (e.g., low power radio communication) between the sensor modules 38, themselves (forming a node to node mesh-type network).

In either configuration, the system 110 of the invention, uses an array of sensor modules to carry out electrical resistance measurements at various locations along the waterwall 23 of a boiler 10. These resistance measurements are then utilized by the control unit 100 along with other system measurements to determine whether or not any slag/ash buildup and/or corrosion is present on the hot side of the waterwall 23 of the boiler (and the extent of any such buildup or corrosion). For example, the measurements at each location may be averaged to determine an average material thickness across a larger area of the waterwall 23. Averaging yields an accurate indication of the presence of buildup due to slag or ash, or corrosion/erosion over the surface of the waterwall 23 hot side surface while smoothing out any outlier measurements resultant from individual sensor module locations). Based on this determination, cleaning or repair operations may be scheduled and carried out at proper intervals that optimize boiler operation and minimize unnecessary downtime. The use of low-power electronics, wireless mesh networking, and the like reduce installation costs and reduce noise issues, which have hampered existing systems. For example, the ability to carry out resistivity measurements locally (i.e., with current injection and voltage measurement being performed by each sensor module 38) obviates the need to supply high power across the entire grid (which was previously necessary to provide useable voltage readings). In addition, using wireless communication means to coordinate the operation of each sensor module 38 and to communicate the measured values to the control unit 100 eliminates the need to run dedicated cables to each of the sensors. As a result, the performance of the boiler and power generation system, as a whole, may be optimized.

While the system 110 for determining the presence of slag and/or corrosion on a waterwall of a fossil-fuel, tangentially fired boiler, the invention is not so limited in this regard. In particular, it is contemplated that the system 100 may be utilized in connection with any type of boiler or combustion system known in the power generation or heat generation arts. Still further, in an embodiment, the system 110 may be utilized to determine or assess corrosion, erosion, or the buildup of slag, ash, or other material on a "hot-side" surface or internal surface of any fluid-carrying chamber, passageway, or conduit such as, for example, piping or ductwork. In particular, in an embodiment, the sensor module 38 may be deployed on the external surface of elbows of piping that may be susceptible to chemical erosion or erosion via the flow of a material or fluid therethrough. Another possible application for thickness measurements is economizer headers, and piping, which can be damaged by flow accelerated corrosion. Because the metal is not heated from the outside, only from the fluid inside, the metal temperature in an insulated header or pipe will be very uniform, allowing on-line thickness measurements at higher operating temperatures. Still further uses of the sensor module 38 and system 110 to assess for the presence of slag or corrosion/erosion include on storage tanks and cracking columns used in petrochemical cracking plants.

Finally, it is also to be understood that the system 110 and/or control unit 100 may include the necessary electronics, software, memory, storage, databases, firmware, logic/state machines, microprocessors, communication links, displays, or other visual or audio user interfaces, printing devices, and any other input/output interfaces to perform the functions described herein and/or to achieve the results described herein. For example, as previously mentioned, the system may include at least one processor and system memory/data storage structures, which may include random access memory (RAM) and read-only memory (ROM). The at least one processor of the system 110 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the control unit 100 to perform the methods disclosed herein may be read into a main memory of the at least one processor from a computer-readable medium. Thus, embodiments of the present invention may perform the methods disclosed herein in real-time. The term "computer-readable medium," as used herein, refers to any medium that provides or participates in providing instructions to the at least one processor of the system 110 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, solid-state drive (SSD), magnetic tape, any other magnetic medium, a CD-ROM, DVD, any other optical medium, a RAM, a PROM, an EPROM or EEPROM (electronically erasable programmable read-only memory), a FLASH-EEPROM, NAND or NOR type flash memory, any other memory chip or cartridge, or any other medium from which a computer can read.

In addition, the described embodiments may incorporate a variety of numerical methods techniques for interfacing the sensor module 38, data captured therefrom, and processing thereof. For example, a variety of techniques for improving the signal to noise ratios to ensure a sufficient signal is obtained for making resistivity computations. Moreover, various techniques may be employed to average or blend measurements over time, spatially, or otherwise. For example, in one embodiment, averages of resistivity calculations may be taken over a selected duration to capture an average measurement where individual measurements are weighted or not. In another embodiment, resistivity measurements may be averaged spatially using, for example, data from sensor modules in a "neighborhood" of a selected sensor module.

In yet another embodiment, automatic gain control and feedback may be utilized to inject currents with the sensor module of varying magnitudes depending on the measured effect of the signal injections at one or more other locations. For example, in one embodiment, filtering of the current supply 132 and voltage input device 135 may be included in the electronic circuitry of sensing module 38 to provide a more stable, less noisy signal and improve the measurement accuracy. The filters may be hardware and built into the circuitry of the sensing module 38. Likewise, the filtering may also be implemented in software as part of the processing executed in processing module 140. The filter may be implemented as a high-order low-pass design to reduce the influence of higher frequency noise on the measurement. In an embodiment, the cut-off frequency of the high-order low-pass filter may be designed to eliminate most noise from 50 Hz or 60 Hz AC power feeding electrical equipment in the vicinity of the boiler 12. In another embodiment, digital signal processing or filtering algorithms, such as those known in the art of digital signal processing and filtering, can be implemented in the processing module 140 to remove noise from the voltage measurement recorded by the voltage measuring device 135.

In another embodiment, the processing module 140 may monitor the voltage read from voltage measurement device 135 and select several readings over a contiguous period of time to average when the standard deviation of these readings is below a certain maximum threshold. In yet another embodiment, software algorithms running in processing module 140 may evaluate a series of voltage readings from voltage measuring device 135, calculate the standard deviation of the group of measurements, remove any measurement more than a certain number of standard deviations from the mean to reduce the influence of noise, and then calculate the average of the remaining voltage measurements. In another embodiment, a plurality of measurements may be used to track the change in resistivity due to temperature or thickness changes over time and over a plurality of locations to determine which locations of the boiler experience the most rapid changes, and may therefore require more frequent cleaning, inspection, or repair. These example embodiments are not intended to exclude similar methods or techniques commonly known to those familiar with the art.

While in embodiments, the execution of sequences of instructions in the software application causes at least one processor to perform the methods/processes described herein, hard-wired circuitry may be used in place of, or in combination with, software instructions for implementation of the described methods/processes. Therefore, embodiments, as described herein, are not limited to any specific combination of hardware and/or software.

In an embodiment, a method of assessing a condition of a boiler includes establishing a baseline resistivity of a boiler waterwall for a plurality of selected locations of the boiler waterwall, measuring a resistivity at least at a first location of the plurality of selected locations, comparing the measured resistivity at least at the first location to the baseline resistivity, determining a condition of the waterwall of the boiler based on the comparison. In an embodiment, the condition is the presence of slag or ash buildup on the hot side of the waterwall or corrosion or erosion of the waterwall on the hot side of the waterwall or the inside of the tubes of the waterwall. In an embodiment, the step of measuring the resistivity of at least at the first location includes measuring a resistivity at each of the plurality of selected locations, wherein the method further includes the step of determining an average measured thickness for the boiler waterwall using each of the measured resistivities along with a separately measured temperature, In an embodiment, the step of comparing the measured resistivity of at least at the first location includes comparing the average measured resistivity to the baseline resistivity. In an embodiment, the method further includes coordinating the resistivity measurements at each of the plurality of selected locations so that at least one of the resistivity measurements occurs at a time different than at least another one of the resistivity measurements. In an embodiment, the step of establishing the baseline resistivity of the boiler waterwall for the plurality of selected locations of the boiler waterwall includes measuring a resistivity at a known constant temperature at each of the plurality of selected locations. In an embodiment, the method further includes compensating the resistivities measured at the known temperatures based on a correlation of the electrical resistivity versus temperature for the waterwall alloy. In an embodiment, the step of measuring a resistivity at least at the first location of the plurality of selected locations includes applying a known current to the boiler waterwall at a first point at the first location and measuring a voltage induced by the application of current at a second point at the first location, wherein the second point is spaced from the first point. In an embodiment, the method further includes the step of installing a resistivity sensor module at the first location to place a first pair of leads of the resistivity sensor module in electrical communication with the boiler waterwall at the first point, and to place a second pair of leads of the resistivity sensor module in electrical communication with the boiler waterwall at the second point. In an embodiment, the resistivity sensor module is installed on a cold side of the boiler waterwall. In an embodiment, installing the resistivity sensor module includes at least one of welding, spot welding, brazing, bolting, screwing, epoxying, and soldering the first pair of leads and the second pair of leads to the boiler waterwall. In an embodiment, measuring the resistivity at least at a first location of the plurality of selected locations includes measuring the resistivity at least at a portion of the plurality of selected locations, and the method further includes the step of receiving, with a control unit, a plurality of measured resistivities corresponding to a portion of the of selected locations. In an embodiment, the method further includes the step of calculating the thickness of the waterwall by comparing the new resistivity measurements from selected locations to references of measurements obtained at those same locations. In an embodiment, the method can further include the optional steps of calculating an average resistivity for the boiler waterwall based on the measured resistivities at the portion of the plurality of selected locations, and based on the calculation, determining an average minimum thickness of the boiler waterwall. Further, in another embodiment, the method includes that establishing a baseline resistivity of a boiler waterwall for a first location of a plurality of locations of the boiler waterwall under a known temperature condition includes measuring the resistivity based on a known thickness of waterwall.

In another embodiment, a system for assessing a condition of a boiler includes a resistivity sensing module electrically connected to a cold side of a waterwall of a boiler at a first location of a plurality of locations under know temperature conditions, the resistivity sensing module is configured to apply a known current to the waterwall via a first pair of leads, and measure a voltage induced by the application of the current via a second pair of leads, and a control unit in communication with the resistivity sensing module, wherein at least one of the resistivity sensing module and the control unit are configured to determine a condition of the waterwall of based at least in part on the measured voltage. In an embodiment, the control unit is in communication with the resistivity sensing module via a wireless network. In an embodiment, the wireless network is at least one of WiFi, Bluetooth, Zigbee, and NFC. In an embodiment, the wireless network is a mesh network. In an embodiment, the resistivity sensing module includes a power source, the power source being configured to generate power via an energy harvesting process, a processor, a communications interface, the communications interface operable to communicate via the communications network, and a four-wire sensor system, the four-wire sensor system including the first pair of leads and the second pair of leads. In an embodiment, the energy harvesting process includes converting heat harvested from the waterwall to electricity employing a Pelletier effect thermoelectric device. In an embodiment, the energy harvesting process uses at least one of RF, photonic, and/or dynamic energy capture devices. In an embodiment, the system further includes a resistivity sensing module electrically connected to a cold side of a waterwall at each of the plurality of locations. In an embodiment, the condition of the waterwall is at least one of slag buildup, ash buildup, corrosion and/or erosion on the hot side of the waterwall, or corrosion and/or erosion inside the tubes of the waterwall.

In yet another embodiment, a system for assessing a condition of an interior wall of a passageway includes at least one resistivity sensing module electrically connected to an exterior wall of the passageway, the resistivity sensing module(s) including a power source, a processor, and a four-wire sensor system including a first pair of leads electrically connected to an exterior wall of the passageway and a second pair of leads electrically connected to the exterior wall of the passageway at a location spaced from the first pair of leads, the resistivity sensing module being configured to apply a known current to the exterior wall of the passageway via the first pair of leads, and measure a voltage induced by the application of the current via the second pair of leads, and a control unit in communication with the resistivity sensing module, wherein at least one of the resistivity sensing module and the control unit are configured to determine the condition of the interior wall of the passageway of based at least in part on the measured voltage. In an embodiment, the condition of the interior wall is at least one of slag buildup, ash buildup, corrosion and/or erosion on the interior wall.

In another embodiment, the sensor module may have lead wires of a similar alloy to the waterwall. Utilizing leads of similar alloys eliminates extraneous voltages caused by the thermocouple effect, which creates increasing voltages at increasing temperatures where two dissimilar metals are joined together.

As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

As used herein, an element or step recited in the singular and proceeded with the word "a" or "an" should be understood as not excluding plural of said elements or steps, unless such exclusion is explicitly stated. Furthermore, references to "one embodiment" of the described embodiments are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Additionally, while the dimensions and types of materials described herein are intended to define the parameters associated with the described embodiments, they are by no means limiting and are exemplary embodiments. Many other embodiments will be apparent to those of skill in the art upon reviewing the above description. The scope of the invention should, therefore, be determined with reference to the appended claims. Such description may include other examples that occur to one of ordinary skill in the art, and such other examples are intended to be within the scope of the claims if they have structural elements that do not differ from the literal language of the claims, or if they include equivalent structural elements with insubstantial differences from the literal languages of the claim. In the appended claims, the terms "including" and "in which" are used as the plain English equivalents of the respective terms "comprising" and "wherein." Moreover, in the following claims, terms such as "first," "second," "third," "upper," "lower," "bottom," "top," etc. are used merely as labels and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

What is claimed is:

1. A method of assessing a condition of a boiler, the method comprising:
providing a plurality of spaced resistivity sensing modules on a cold side of a waterwall of the boiler to form a matrix with each of the resistivity sensing modules representative of a measurement node in the matrix, each of the resistivity sensing modules including a communications interface enabling communication with the other resistivity sensing modules in the matrix and a control unit operatively coupled to the plurality of spaced resistivity sensing modules, a processing module, a four-wire sensing device, and a power source to power the communications interface, the processing module, and the four-wire sensing device based on electricity converted from heat harvested from the boiler waterwall; and coordinating operation of the plurality of resistivity sensing modules with the control unit to obtain resistivity sensing measurements of the boiler waterwall, wherein the control unit permits only one of the resistivity sensing modules to obtain a resistivity sensing measurement at any time to avoid influence of the other resistivity sensing modules during the measurements, wherein obtaining the resistivity sensing measurements includes;

establishing a baseline resistivity of the boiler waterwall for a first location of a plurality of locations of the boiler waterwall under a known temperature condition;

measuring a resistivity for the first location of the plurality of locations of the boiler waterwall under another temperature condition;

comparing the measured resistivity for the first location to the baseline resistivity for the first location; and determining a condition of the boiler waterwall based on the comparison.

2. The method according to claim 1, wherein:
the condition of the boiler waterwall is at least one of slag buildup, ash buildup, corrosion or erosion on the cold side of the boiler waterwall, and erosion or corrosion inside a tube of the boiler waterwall.

3. The method according to claim 1, further comprising:
measuring a resistivity at a second location of the plurality of locations;
comparing the measured resistivity for the second location to a baseline resistivity for the second location; and
determining the condition of the boiler waterwall based on at least one of the resistivity at the first location and the resistivity from the second location.

4. The method according to claim 3, further comprising:
coordinating the resistivity measurements at each location of the plurality of locations so that at least one of the resistivity measurements at the plurality of locations occurs at a time different than that of at least another one of the resistivity measurements at another location of the plurality of locations.

5. The method according to claim 1, wherein:
the establishing of the baseline resistivity of the boiler waterwall for the plurality of locations of the boiler waterwall comprises measuring a resistivity at a known constant temperature, at least at the first location of the plurality of locations.

6. The method according to claim 1, further comprising:
compensating the resistivities measured based on a correlation of the electrical resistivity versus temperature at known temperatures for the boiler waterwall.

7. The method according to claim 1,
wherein each of the resistivity sensing modules in the matrix places a first pair of leads from the four-wire sensing device in electrical communication with the boiler waterwall at a first point, and places a second pair of leads from the four-wire sensing device in electrical communication with the boiler waterwall at a second point, wherein the second point is spaced from the first point by a known distance.

8. The method according to claim 7, wherein:
the of measuring of the resistivity at the first location of the plurality of locations comprises applying a known current to the boiler waterwall from the first point to the second point at the first location, and measuring a voltage induced by the application of the known current from the first point to the second point.

9. The method according to claim 7, wherein the providing of the plurality of spaced resistivity sensing modules on the cold side of the boiler waterwall comprises installing the resistivity sensing modules by at least one of welding, spot welding, brazing, bolting, screwing, epoxying, and soldering the first pair of leads and the second pair of leads to the boiler waterwall.

10. The method according to claim 1, wherein:
the measuring of the resistivity at a first location of the plurality of locations comprises measuring the resistivity at least at a portion of the plurality of locations; and
wherein the method further comprises receiving, with the control unit, a plurality of measured resistivities corresponding to the at least a portion of the plurality of selected locations.

11. The method according to claim 10, further comprising:
calculating an average resistivity or change of resistivity for the boiler waterwall based on at least two measured resistivities at the portion of the plurality of selected locations; and
based on the calculation, determining the condition of the boiler waterwall.

12. A system for assessing a condition of a boiler, comprising:
a plurality of spaced resistivity sensing modules disposed on a cold side of a waterwall of the boiler, the plurality of resistivity sensing modules forming a matrix with each of the resistivity sensing modules representative of a measurement node in the matrix, each of the resistivity sensing modules including a communications interface enabling communication with the other resistivity sensing modules in the matrix, a processing module, a four-wire sensing device, and a power source to power the communications interface, the processing module, and the four-wire sensing device based on electricity converted from heat harvested from the boiler waterwall, wherein each of the resistivity sensing modules is configured to apply a known current to the boiler waterwall via a first pair of leads from the four-wire sensing device and measure a voltage induced by the application of the current via a second pair of leads from the four-wire sensing device; and
a control unit operatively coupled to the plurality of spaced resistivity sensing modules, wherein the control unit is configured to coordinate operation of the plurality of resistivity sensing modules to obtain resistivity sensing measurements of the boiler waterwall, wherein the control unit permits only one of the resistivity sensing modules to obtain a resistivity sensing measurement at any time to avoid influence of the other resistivity sensing modules during the measurements, wherein at least one of the resistivity sensing modules and the control unit are configured to determine a condition of the boiler waterwall based at least in part on the measured voltage.

13. The system of claim 12, further comprising a temperature sensor, the temperature sensor operative to measure a temperature of the boiler waterwall, the temperature sensor in operative communication with at least one of the plurality of resistivity sensing modules and the control unit, wherein at least one of the plurality of resistivity sensing modules and the control unit are configured to determine a condition of the boiler waterwall.

14. The system of claim 12, wherein:
the control unit is in communication with the plurality of resistivity sensing modules via a wireless network.

15. The system of claim 12, wherein:
the power source of each of the resistivity sensing modules is configured to generate power via an energy harvesting process.

16. The system of claim 15, wherein:
the energy harvesting process comprises at least one of converting heat harvested from the boiler waterwall to electricity employing a Pelletier effect thermoelectric device, RF, photonic, and/or dynamic energy capture devices.

17. The system of claim 12, wherein:
the condition of the boiler waterwall is at least one of slag buildup, ash buildup, corrosion or erosion on the cold side of the boiler waterwall, and erosion or corrosion inside a tube of the boiler waterwall.

18. A system for assessing a condition of an interior wall of a passageway, comprising:
a plurality of resistivity sensing modules electrically connected to an exterior wall of the passageway, each of the resistivity sensing modules including a communications interface enabling communication with other resistivity sensing modules, a processing module, a processor, a four-wire sensing device having a first pair of leads electrically connected to the exterior wall of the passageway and a second pair of leads electrically connected to the exterior wall of the passageway at a location spaced from the first pair of leads, and a power source to power the communications interface, the processing module, and the four-wire sensing device based on electricity converted from heat harvested from the passageway, wherein each of the resistivity sensing modules is configured to apply a known current to the exterior wall of the passageway via the first pair of leads, and measure a voltage induced by the application of the current via the second pair of leads; and
a control unit operatively coupled to the plurality of spaced resistivity sensing modules, wherein the control unit is configured to coordinate operation of the plurality of resistivity sensing modules to obtain resistivity sensing measurements of the exterior wall of the passageway, wherein the control unit permits only one of the resistivity sensing modules to obtain a resistivity sensing measurement at any time to avoid influence of the other resistivity sensing modules during the measurements;
wherein at least one of the resistivity sensing modules and the control unit are configured to determine the condition of the interior wall of the passageway based at least in part on the measured voltage.

* * * * *